A. McDERMID.
TOOL HANDLE.
APPLICATION FILED SEPT. 4, 1909.
1,042,942.
Patented Oct. 29, 1912.
2 SHEETS—SHEET 1.
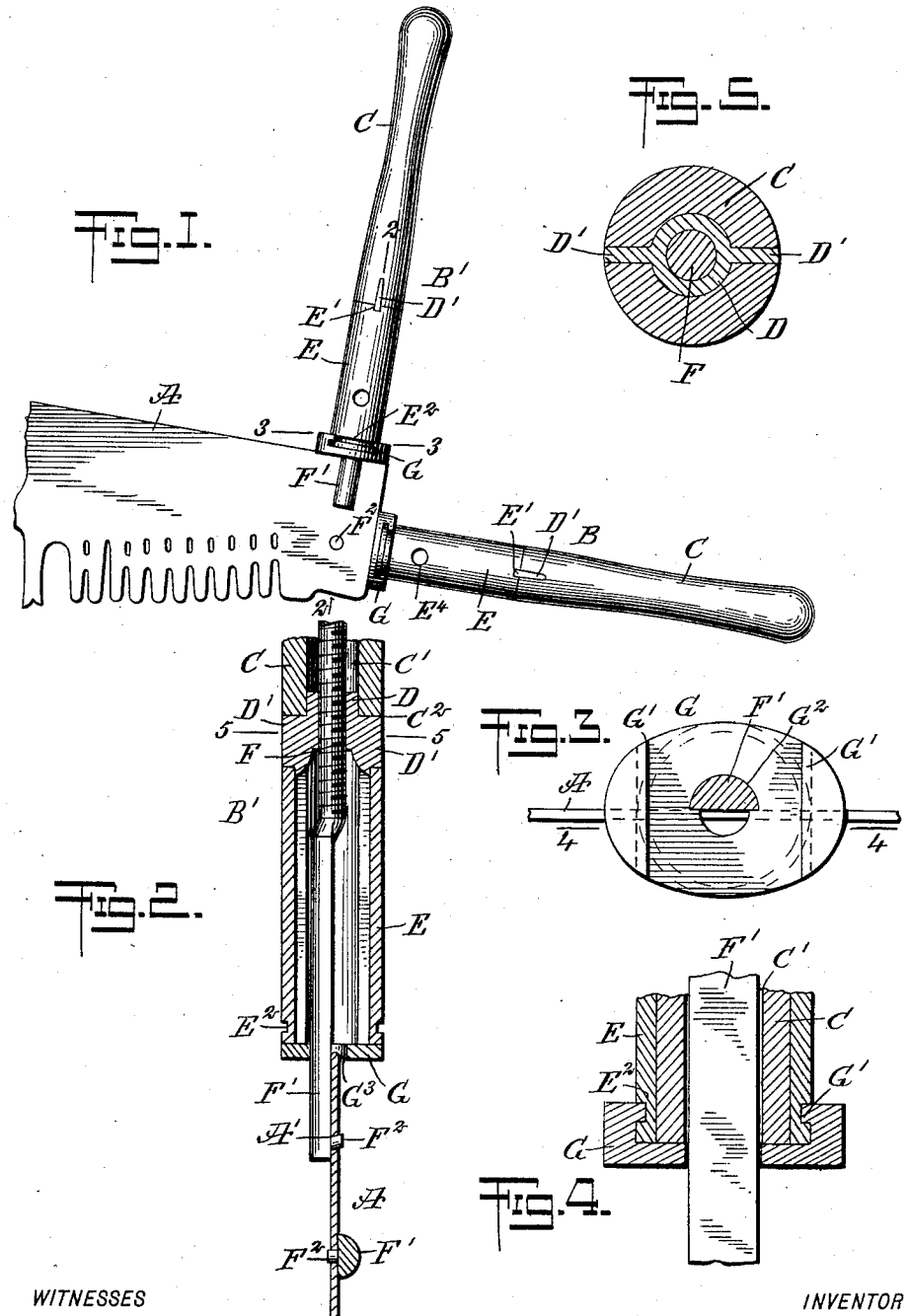
WITNESSES
G. Robert Thomas
Rev. G. Hooster
INVENTOR
Archie McDermid
BY Munn & Co
ATTORNEYS A. McDERMID.
TOOL HANDLE.
APPLICATION FILED SEPT. 4, 1909.
1,042,942.
Patented Oct. 29, 1912.
2 SHEETS—SHEET 2.
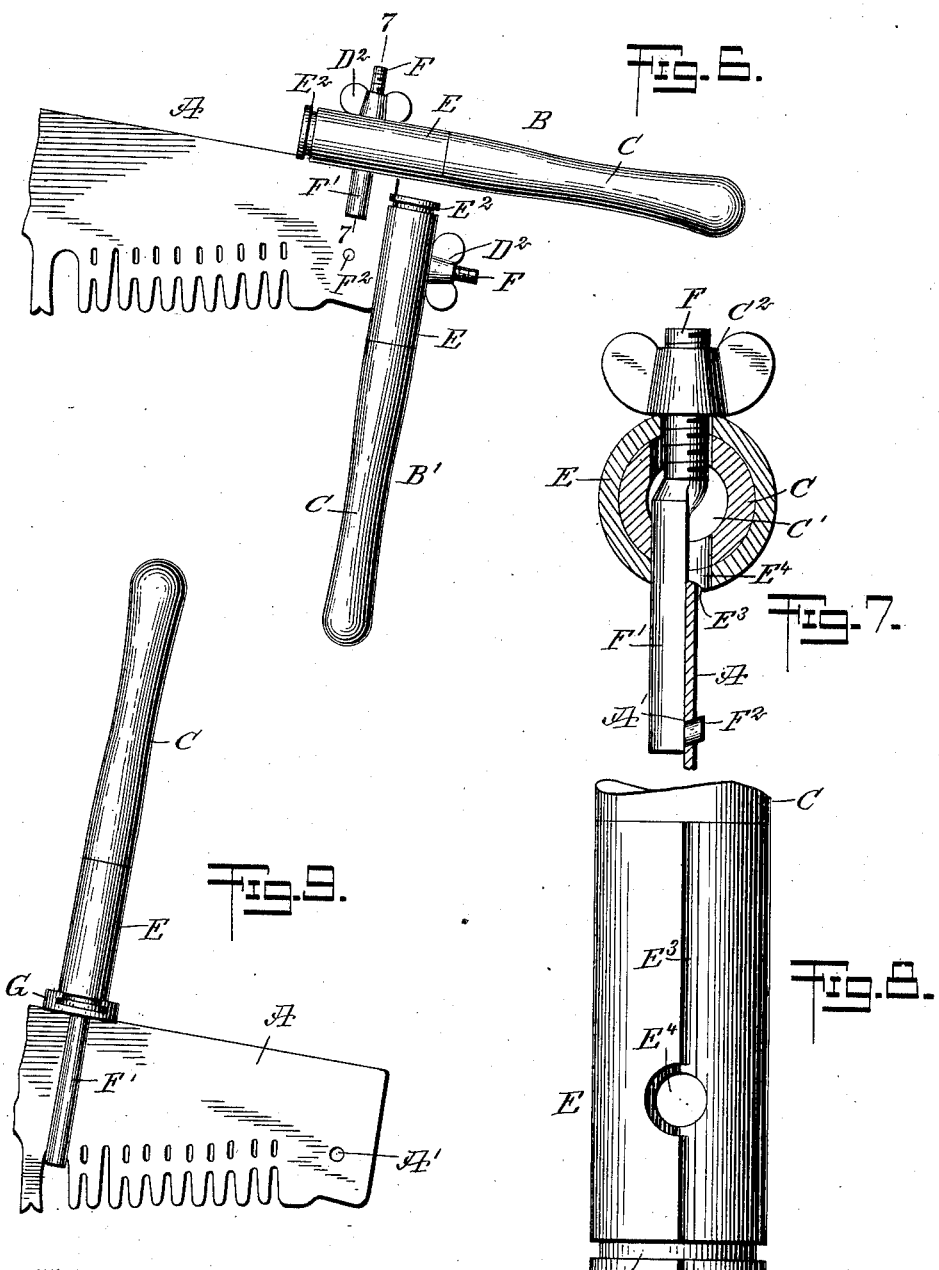
INVENTOR
Archie McDermid
BY
ATTORNEYS

UNITED STATES PATENT OFFICE.

ARCHIE McDERMID, OF EL PASO, TEXAS.

TOOL-HANDLE.

1,042,942.  Specification of Letters Patent.  Patented Oct. 29, 1912.

Application filed September 4, 1909. Serial No. 516,180.

*To all whom it may concern:*

Be it known that I, ARCHIE McDERMID, a citizen of the United States, and a resident of El Paso, in the county of El Paso and State of Texas, have invented a new and Improved Tool-Handle, of which the following is a full, clear, and exact description.

The object of the invention is to provide a new and improved tool handle for use on saws and other tools, and arranged to permit the operator to conveniently attach the handle to the tool in any desired position to suit the convenience of the user of the tool.

The invention consists of novel features and parts and combinations of the same, which will be more fully described hereinafter and then pointed out in the claims.

A practical embodiment of the invention is represented in the accompanying drawings forming a part of this specification, in which similar characters of reference indicate corresponding parts in all the views.

Figure 1 is a side elevation of the improvement as applied to a cross-cut saw; Fig. 2 is an enlarged cross section of the same on the line 2—2 of Fig. 1; Fig. 3 is an enlarged sectional plan view of the same on the line 3—3 of Fig. 1, the ferrule being omitted; Fig. 4 is a sectional side elevation of the same on the line 4—4 of Fig. 3, the ferrule being in position; Fig. 5 is an enlarged sectional plan view of the improvement on the line 5—5 of Fig. 2; Fig. 6 is a side elevation of the improvement, showing the handle applied to a cross-cut saw but in a different position from the one illustrated in Fig. 1; Fig. 7 is an enlarged transverse section of the same on the line 7—7 of Fig. 6; Fig. 8 is an enlarged side elevation of the ferrule and handle, and Fig. 9 is a side elevation of the improvement as applied to a cross-cut saw at the teeth thereof.

As illustrated in Fig. 1, the saw A is provided at the end with two handles B and B', of which the handle B extends in the direction of the length of the saw A while the handle B' is arranged approximately at right angles to the handle B, and extends in an upward direction from the top of the saw A. The handles B and B' are alike in construction, so that it suffices to describe but one in detail. Each of the handles B and B' is provided with a handle proper C, made hollow at its lower end as at C', and into this hollow end fits a nut D, provided with wings D' extending outwardly into a diametrical slot $C^2$ formed in the lower hollow portion of the handle C, so as to hold the nut D from turning in the handle C. A ferrule E is slipped onto the lower and somewhat reduced end of the handle C, and this ferrule is provided near its upper end with notches E', engaged by the wings D' of the nut D, to hold the ferrule E against turning on the handle C.

In the nut D screws a screw rod F, terminating at its lower end in a flattened non-threaded portion F', resting against one face of the saw A, and provided near its terminal with a lug $F^2$, extending through an aperture A' formed in the saw blade, as plainly indicated in Fig. 2. The flattened portion F' of the screw rod F extends through a bearing G, held on the lower end of the ferrule E, the latter being for this purpose provided with an annular groove $E^2$, into which project inwardly-extending parallel flanges G', formed on the bearing G, which latter is provided at its under side with a longitudinal recess $G^3$, adapted to engage the edge of the blade of the saw A (see Fig. 2). The opening $G^2$ in the bearing G corresponds to the flattened portion F' of the screw rod F, so that the bearing G is held against turning on the flattened portion F' of the screw rod F, but the ferrule E is free to turn in the bearing G, so that when the handle C is turned and with it the nut D and the ferrule E, then the screw rod F is caused to move in the direction of its length, to firmly engage the lug $F^2$ with the opening in the saw blade, and at the same time the bearing G is drawn into firm clamping contact with the edge of the saw blade, to securely hold the handle B or B' in position on the saw A. By the arrangement described the handles B and B' can be readily and firmly secured in place on the ends of the saw A, and when it is desired to remove the said handles it is only necessary for the operator to turn the handle C in a reverse direction, to unscrew the nut D on the corresponding screw rod F, to loosen the bearing G and to permit of disengaging the lug $F^2$ from the opening in the blade of the saw A.

As shown in Fig. 8, the ferrule E is provided with an external longitudinally-extending groove $E^3$, and with a transverse aperture $E^4$, for the passage of the screw rod F, in case it is desired to use the handles B and B, as illustrated in Figs. 6 and 7. The handle B, shown in Fig. 6, extends longitudinally from the top edge of the blade of the saw A, while the handle B' extends at a right angle to the handle B and in a downward direction from the end of the blade of the saw A. In the arrangement mentioned the bearings G and the nuts D are dispensed with, and instead of the latter, ordinary wing nuts $D^2$ are employed, screwing on the screw rods F against the ferrules E at a point diametrically opposite the groove $E^3$ engaging the corresponding edge of the blade of the saw A (see Fig. 7).

Instead of hooking the lug $F^2$ into an aperture A', as previously explained, the said hook may be engaged with the saw between two adjacent teeth, as plainly indicated in Fig. 9.

The tool handle shown and described is very simple and durable in construction, and can be applied readily to the saw in a desired position or removed therefrom whenever it is desired to do so.

Having thus described my invention, I claim as new and desire to secure by Letters Patent:

1. A tool handle, comprising a handle hollow at one end and provided with opposite slots in its sides, a nut in the handle and provided with wings extending into the slots of the handle, the wings of the nut being longer than the slots, a ferrule on the handle and having one end notched to receive the wings of the said nut and provided with an annular groove at its other end, a bearing provided with flanges fitting in the groove of the sleeve and having an opening in its end and a recess adjacent said opening, and a screw rod screwing in the nut and having a flattened end projecting through the opening of the bearing, said flattened end being provided with a lug for engaging the tool.

2. A handle for saws, comprising a handle hollow at one end and provided with opposite slots in its sides at the end, a nut in the handle and provided with wings, extending into the slots, the wings of the nut being longer than the said slots, a ferrule on the handle, and having one end notched to receive the wings of the nut, a bearing mounted to turn on the lower end of the ferrule and having an opening in its end and a recess adjacent said opening and a screw rod screwing in the nut, and having a flattened portion projecting through the opening of the bearing and provided adjacent to the end thereof with a lug for engaging a saw.

In testimony whereof I have signed my name to this specification in the presence of two subscribing witnesses.

ARCHIE McDERMID.

Witnesses:
HARRIS WALTHALL,
H. G. CLUNN.

Copies of this patent may be obtained for five cents each, by addressing the "Commissioner of Patents, Washington, D. C."